United States Patent [19]
van der Wal

[11] Patent Number: 5,299,223
[45] Date of Patent: Mar. 29, 1994

[54] OPTICALLY PUMPED LASER

[75] Inventor: Peter van der Wal, Bonn, Fed. Rep. of Germany

[73] Assignee: MAN Technologie AG, Munich, Fed. Rep. of Germany

[21] Appl. No.: 16,985

[22] Filed: Feb. 3, 1993

[51] Int. Cl.$^5$ ............................................. H01S 3/081
[52] U.S. Cl. ...................................... 372/94; 372/93; 372/55
[58] Field of Search .................... 372/94, 92, 55, 56, 372/99, 93

[56] References Cited

U.S. PATENT DOCUMENTS 5,148,443  9/1992  Du et al. ............................. 372/93

FOREIGN PATENT DOCUMENTS

| 3013301 | 10/1981 | Fed. Rep. of Germany. | |
|---|---|---|---|
| 3425916 | 2/1985 | Fed. Rep. of Germany. | |
| 0078189 | 5/1982 | Japan | 372/55 |
| 0219988 | 8/1992 | Japan | 372/94 |

OTHER PUBLICATIONS

J. Heppner and C. O. Weiss; Far-infrared ring laser; 1978; pp. 590-592.

C. O. Weiss, W. Klische, P. S. Ering and M. Cooper; Instabilities and Chaos . . . ; Oct. 22, 1984; pp. 405-408.
P. T. Lang, W. Schatz and K. F. Renk; Generation of subnanosecond . . . ; 1991; pp. 29-36.
H. P. Roser, R. Wattenbach; The Optically Pumped . . . . ; Jun. 1, 1984; pp. 165-175.
T. A. Fischer, J. J. Tiee and C. Wittig; Optically pumped . . . ; Oct. 1, 1980; pp. 592-594.
Scott Holswade et al; Experimental evaluation . . . ; Nov. 1, 1988; pp. 4396-4406.

Primary Examiner—Georgia Y. Epps
Attorney, Agent, or Firm—Robert W. Becker & Associates

[57] ABSTRACT

A ring resonator comprised of four mirrors arranged at an angle of 45° relative to the pump laser is suggested for an optically pumped far infrared laser. The mirrors are arranged in pairs which are positioned in evacuated chambers of the laser housing together with the ends of two waveguides. The pump laser is introduced into the resonator via a bore in one of the mirrors. The ring resonator provides for a completely wavelength-independent insulation between the pump laser and the ring laser. The system also provides for a minimal power loss of the FIR laser beam.

7 Claims, 1 Drawing Sheet

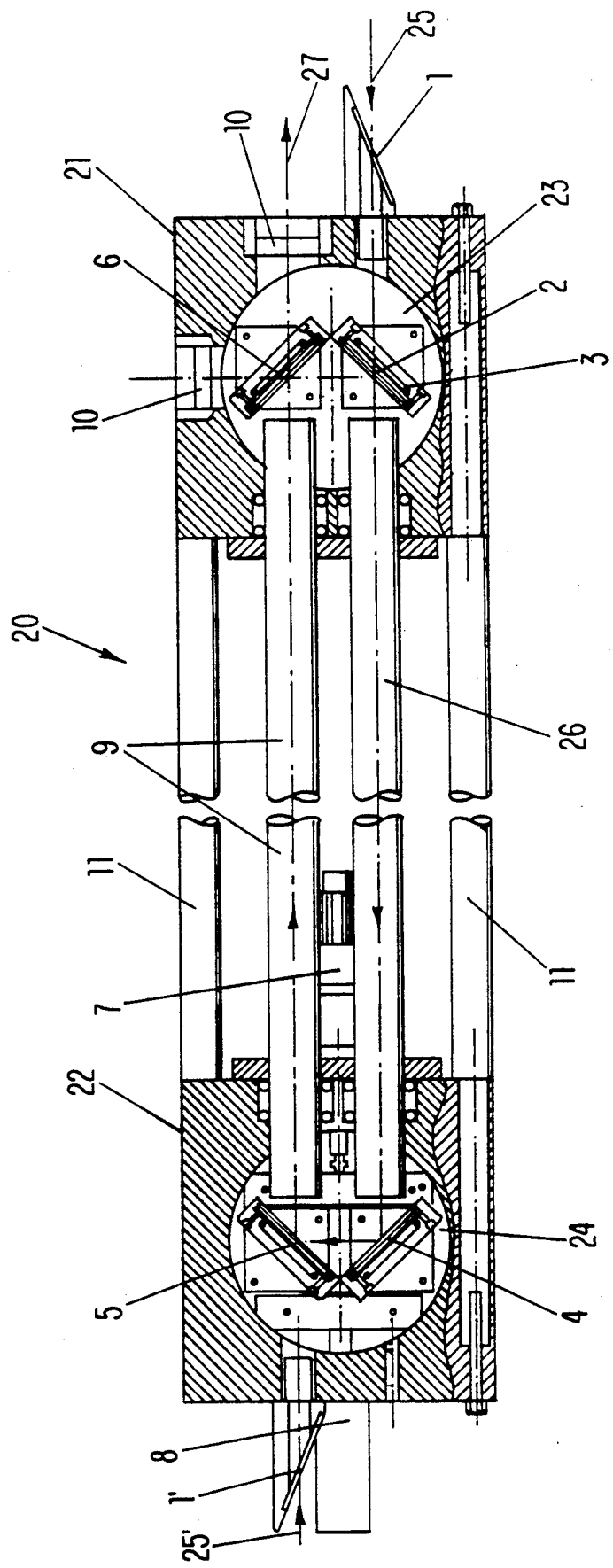

OPTICALLY PUMPED LASER

BACKGROUND OF THE INVENTION

The present invention relates to an optically pumped far infrared laser having a resonator formed of at least three mirrors which are arranged in a vacuum-tight housing filled with laser gas and having furthermore a means for introducing a pump laser.

With optically pumped far infrared lasers (FIR laser) power stabilization generally presents a problem because a small portion of the pumping power introduced into the FIR laser resonator is reflected into the pump laser. This is known from carbon dioxide or nitrous oxide lasers, including doped embodiments. Accordingly, the standing wave resonators of FIR lasers and pump lasers are coupled to one another and can be viewed as a weakly coupled oscillating circuit. This coupling results in frequency and amplitude instabilities within the pump laser which results in strong amplitude fluctuations within the FIR laser. In practice, this so-called feed back coupling effect prevents an active frequency stabilization of the pump laser.

In order to realize a stable pump laser frequency and thus a stable output power for the FIR laser, an effective optical insulation of the pump laser and the FIR laser is an indispensable requirement. Because in many cases a pump laser within a wave length range between 9 and 11 μm is to be used in order to provide f or a wide spectrum of FIR laser frequencies, universal broad range solutions are not realizable with classical polarization methods such as ¼ wavelength platelets. Other methods, for example, insulation by acoustic-optical modulation or skewed introduction, result in a considerable loss of the pumping effectiveness.

From the journal article "Appl. Phys. Lett. 33 (7), 1. October 1978, S. 590-592" an FIR laser of the aforementioned kind is known which is called a ring laser and which is provided with a resonator with three mirrors embodied and arranged such that the laser beam is reflected from one mirror to the next in a ring-like fashion. For this open resonator the introduction of the pumping power is achieved with a special grate. With this known ring laser the feedback coupling effects of the pumping power are prevented; however, the open resonator results in considerable power losses. Furthermore, the introduction method used in the known device strongly depends on the wavelength of the pump laser and the ring laser.

It is therefore an object of the present invention to provide a laser of the aforementioned kind which has no feedback coupling effects and in which power losses are essentially prevented.

BRIEF DESCRIPTION OF THE DRAWINGS

This object, and other objects and advantages of the present invention, will appear more clearly from the following specification in conjunction with the only drawing, in which one specific embodiment of the invention is represented.

SUMMARY OF THE INVENTION

The optically pumped far infrared laser of the present invention is primarily characterized by a vacuum-tight housing filled with laser gas, the housing having means for introducing a pump laser, and a ring resonator comprised of four mirrors, each mirror arranged at an angle of 45° relative to the pump laser, and further comprised of at least two waveguides, with at least one of the mirrors having a bore for introducing the pump laser and with a further one of the mirrors serving as an exit mirror for the far infrared wave front.

By selecting and arranging four mirrors to form a resonator it is possible to use waveguides between the mirrors and to thereby drastically reduce power losses relative to known ring laser arrangements. The pumping power within the ring resonator formed by four mirrors cannot be reflected back into the pump laser. A feed back coupling is thus prevented so that a stable FIR laser power is generated when the pump laser is actively stabilized.

With the inventive FIR ring laser a complete wavelength-independent insulation between the pump laser and the ring laser can be observed. Experimental data prove that the pump frequency can be changed without problems by adjusting or tuning the pump laser resonator. This results in the further advantage that the direction of the wave front within the FIR ring laser can be predetermined externally by adjusting the ring laser resonator or by adjusting the frequency of the pump laser. Furthermore, it has been demonstrated that the effectiveness of the pumping process with a ring laser is much greater than with a conventional standing wave laser. Experiments with the inventive system have shown that essentially each pump photon creates a FIR photon. The inventive FIR ring laser is furthermore suitable for a wide range of wavelengths.

Preferably, the exit mirror has an infrared transmissive area for allowing at least a portion of the far infrared laser beam to exit.

Expediently, two of the mirrors form a first pair with an angle of 90° between the two mirrors and the other two mirrors form a second pair with an angle of 900 between the other two mirrors. The waveguides in this embodiment are parallel to one another with the first pair of mirrors arranged at a first end of the waveguides and the second pair of mirrors arranged at a second end of the wave guides. Accordingly, only two waveguides are needed for guiding back and forth the laser wave front between the mirror pairs. The required evacuated housing is thereby reduced to two separate housing parts with reduced interior chambers. Each chamber receives one mirror pair and a respective end of the waveguides.

The waveguides are tubes made of dielectric materials such as Pyrex glass, quartz glass, or metal, for example, a gold-plated copper tube. The two housing parts arranged on either end of the waveguides are connected to one another by rods which extend parallel to the waveguides and are comprised of a material with a low thermal expansion coefficient in order to prevent changes of the longitudinal dimensions of the resonator. Suitable materials are: Invar, Zerodur, carbon fibers.

The mirrors of the resonator are commonly plated with a reflection layer made of gold. The introduction of the pump laser is carried out via one of the mirrors of the resonator which is provided with a small conical bore. It is also possible to divide the pump laser and to introduce the divided pump laser via bores of two mirrors.

The laser beam exits preferably via one mirror which is comprised of a FIR transmissive material having its mirror surface coated with gold with the exception of a small central surface area. It is also possible to provide a coating in the form of a grate structure in order to allow the laser beam to exit.

Preferably, the inventive laser further comprises a means for adjusting at least one of the mirror pairs.

DESCRIPTION OF THE PREFERRED EMBODIMENTS

The present invention will now be described in detail with the aid of a specific embodiment utilizing the only figure.

The drawing represents a cross-sectional view in the longitudinal direction of a FIR ring laser 20. The ring laser 20 is comprised of two separate housing parts 21 and 22 which are connected by rods 11 made of Invar, Zerodur, carbon fibers or similar materials having a lower thermal expansion coefficient. The evacuated inner chambers 23, 24 of the housing parts 21, 22 receive a mirror pair 3, 6, respectively, 4, 5 in order to form a ring resonator, whereby the mirrors are arranged at a 45° angle relative to the incoming pump laser so that the reflected beam of one mirror reaches the neighboring mirror. For the laser path between the two mirror pairs 3, 6 and 4, 5 waveguides 9 are provided which are comprised of quartz or Pyrex glass or a metal tube. In the inventive design, the mirrors 3 and 6, respectively 4 and 5 of a respective mirror pair are arranged close to one another and form an angle of 90°. This results in a space-saving arrangement, and the open path of the laser beam within the evacuated chambers 23 and 24 is minimized so that power loss is reduced to a minimum.

Pump laser 25 is introduced into the evacuated chamber 23 via a Brewster window 1 arranged at an end face of the ring laser 20. Via a bore 2 within the mirror 3 the pump laser reaches the ring resonator filled with a laser gas. The Brewster window 1 is comprised of, for example, zinc selenide. The bore 2 within the mirror 3 has a diameter of 1 to 2 mm.

The introduction of the pump laser 25 can also be achieved simultaneously at both end faces by providing at the second housing part 22 a further Brewster window 1' for a second portion of the pump laser 25'. In this case, the mirror 5 must be provided with a further bore.

The laser beam 26 generated within the ring resonator 4, 5, 9 partially exits the housing part 21 through a correspondingly designed mirror 6 and a vacuum-tight window 10. In order to allow the exit of the laser beam 26 the exit mirror 6 of the ring resonator is comprised of a FIR transmissive material which is however intransmissive for the pump laser 25. The mirror 6 is coated with gold with the exception of a small, centrally arranged elliptical portion. The laser beam exits through the uncoated area of the mirror 6. Instead of a gold coating it is also possible to provide a metallic grate structure that can be produced by a lithographic method. On top of the metallic grate structure a dielectric coating comprised of a plurality of layers is vapor-deposited which effectively reflects the pump laser 25. The grate structure can be defined such that only a certain portion of the laser beam 26 exits the resonator.

It is advantageous that the introduction of the pump laser 25 and the exit of the laser beam 27 occur via one of the mirror pairs, for example, mirrors 3 and 6. The second mirror pair 4, 5 is then free for adjusting the ring resonator. For this purpose, the second mirror pair 4, 5 is supported on a highly precise and play-free spherical guide. The position of this mirror pair 4, 5 and thus the information about a longitudinal change of the resonator is detected and supervised by an inductive receiving element 8. The position of the mirror pair 4, 5 can be adjusted according to the desired resonator length by a differential micrometer gauge 7.

As a laser gas methanol, formic acid, or $CH_2F_2$ can be used.

A change of the direction of the wave front within the FIR ring laser depends on the type of laser gas used. Homogeneously and inhomogeneously broadened laser lines show different behaviors. Inhomogeneously broadened lines result in a change of the direction exactly at the center of the line profile, while for inhomogeneously broadened lasers the frequency at which the direction is changed depends on the direction in which the length of the FIR resonator or the frequency of the pump laser is changed. With inhomogeneously broadened lasers, the change of the direction does not occur at the center of the line profile.

The present invention is, of course, in no way restricted to the specific disclosure of the specification and drawings, but also encompasses any modifications within the scope of the appended claims.

What I claim is:

1. An optically pumped far infrared laser comprising:
   a vacuum-tight housing filled with laser gas, said housing having means for introducing a pump laser; and
   a ring resonator comprised of four mirrors, each said mirror arranged at an angle of 45° relative to the pump laser, and further comprised of at least two waveguides, with at least one of said mirrors having a bore for introducing the pump laser and with a further one of said mirrors serving as an exit mirror for the far infrared wave front.

2. A laser according to claim 1, wherein said exit mirror has an infrared transmissive area for allowing at least a portion of the far infrared laser beam to exit.

3. A laser according to claim 1, wherein two of said mirrors form a first pair with an angle of 90° between said two mirrors and the other two of said mirrors form a second pair with an angle of 90° between said other two mirrors, and wherein said waveguides are parallel to one another, with said first pair arranged at a first end of said waveguides and said second pair arranged at a second end of said waveguides.

4. A laser according to claim 3, further comprising a means for adjusting at least one of said first and second pairs.

5. A laser according to claim 3, wherein said housing is comprised of two housing parts, with a first housing part receiving said first pair and said first end of said waveguides and a second housing part receiving said second pair and said second end of said waveguides.

6. A laser according to claim 5, further comprising rods comprised of a material with a low thermal expansion coefficient selected from the group consisting of Zerodur, Invar, and carbon fibers, for connecting said two housing parts.

7. A laser according to claim 1, wherein said waveguides are tubes made of a dielectric material selected from the group consisting of Pyrex glass, quartz glass, and metal.

* * * * *